Patented Mar. 6, 1923.

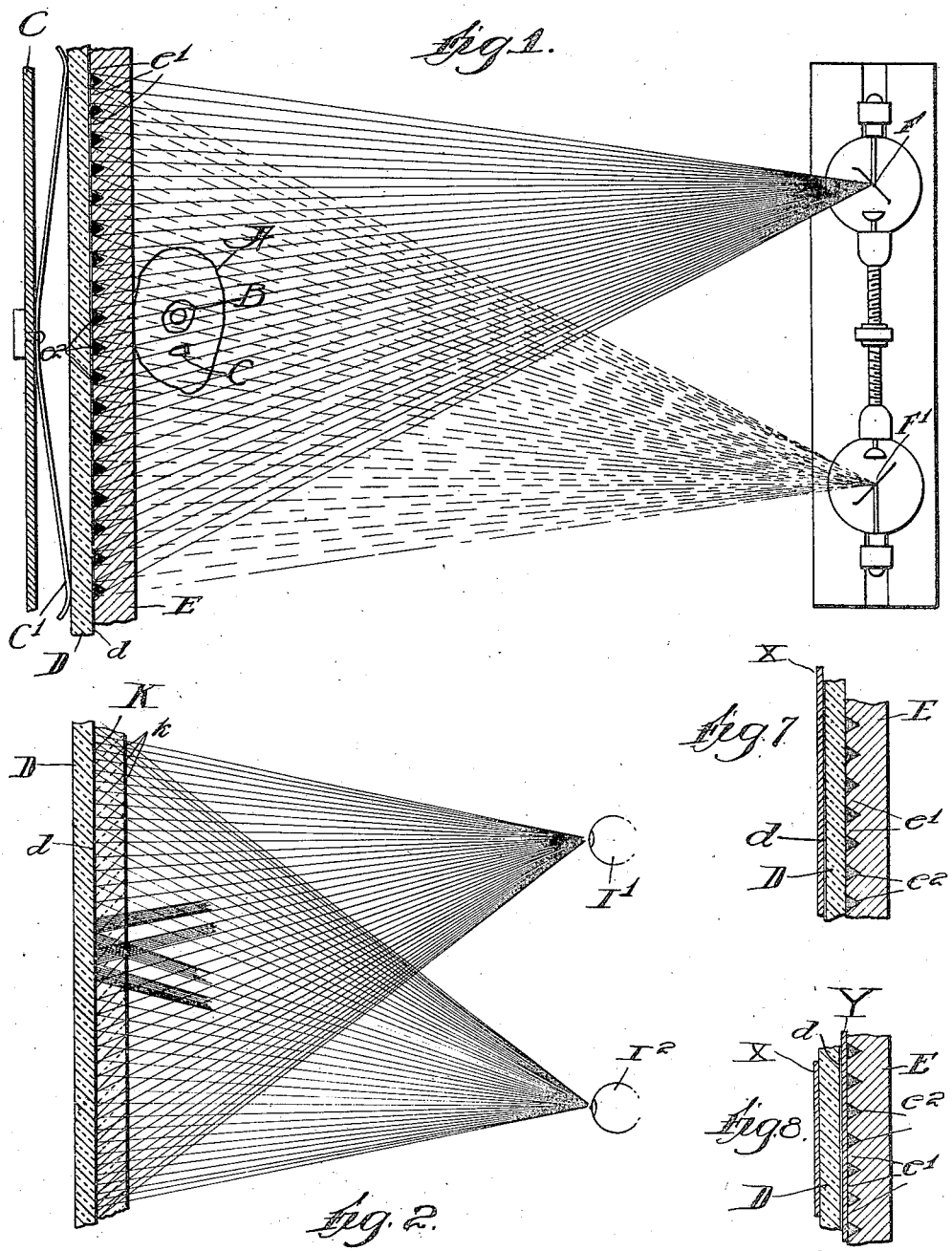

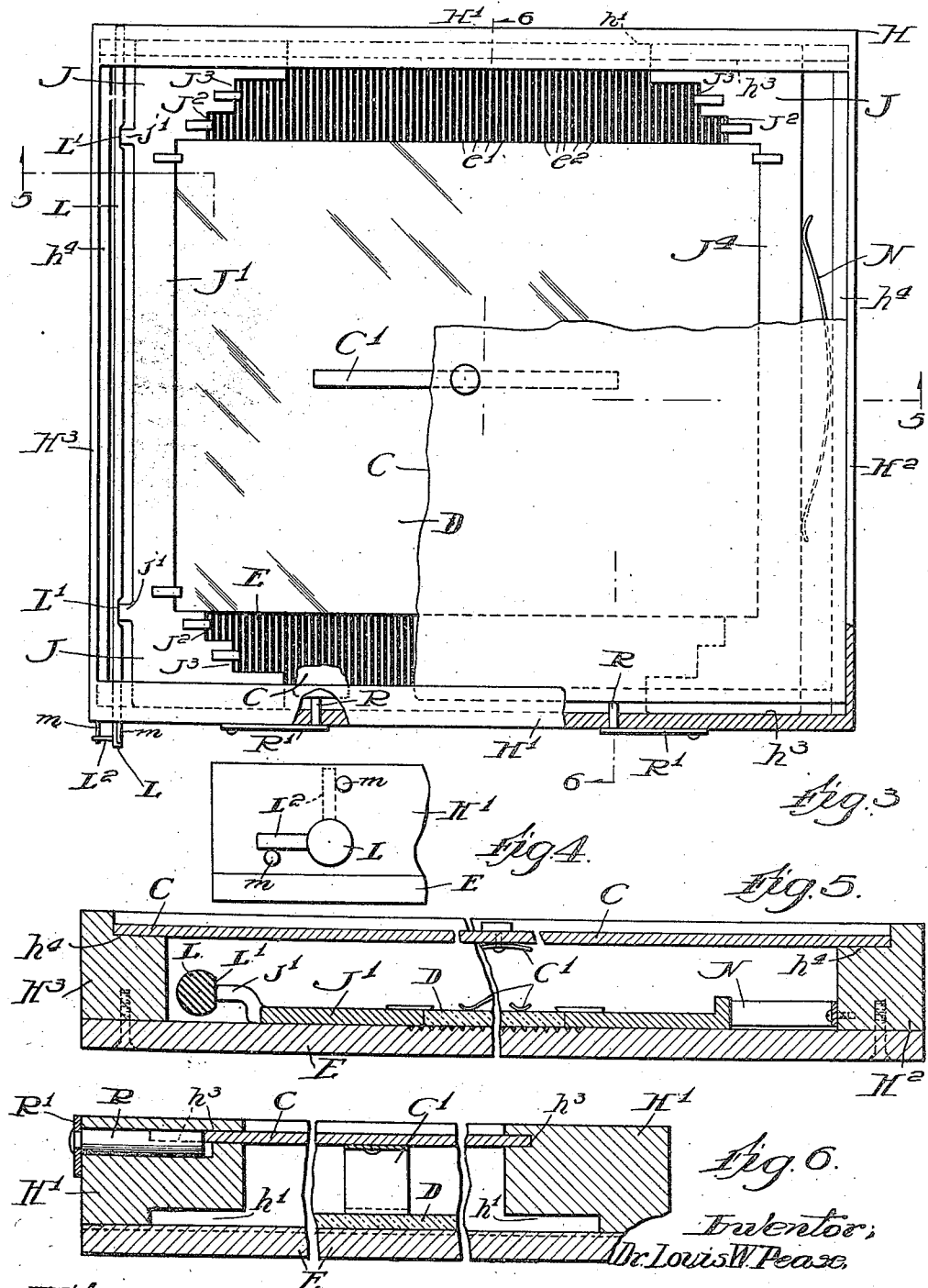

1,447,399

UNITED STATES PATENT OFFICE.

LOUIS W. PEASE, OF CHICAGO, ILLINOIS.

DEVICE AND METHOD FOR MAKING STEREOSCOPIC X-RAY PICTURES.

Application filed June 6, 1919. Serial No. 302,220.

*To all whom it may concern:*

Be it known that I, LOUIS W. PEASE, a citizen of the United States, residing at Chicago, in the county of Cook and State of Illinois, have invented certain new and useful Improvements in Devices and Methods for Making Stereoscopic X-Ray Pictures, of which the following is a specification, reference being had to the accompanying drawings, forming a part thereof.

The purpose of this invention is to provide a method or process and an apparatus or devices for producing and viewing a stereoscopic X-ray picture, that is, a picture which shall give the stereoscopic or relief effect without the use of an instrument for viewing it. It consists in the elements and features of construction of the device and in the steps of the process hereinafter described, as indicated in the claims.

In the drawings:

Figure 1 is a diagrammatic view representing a section of a stereoscopic picture and screen by the use of which it is produced, in relation to the X-ray beams for producing it, the dimensions of the alternating lines or areas of the picture being exaggerated for the purpose of delineating distinguishable ray lines in their relation to the different parts.

Figure 2 is a diagrammatic view showing in a manner similar to Figure 1, a picture in relation to the viewing screen and the positions of the eyes of the observer.

Figure 3 is a plan view of a cassette for holding the necessary parts for producing a picture according to this invention, certain parts being broken away to disclose the interior.

Figure 4 is a detail edge elevation of a shifting device for shifting the screen.

Figure 5 is a section at the line 5—5 on Figure 3.

Figure 6 is a section at the line 6—6 on Figure 3.

Figure 7 is a detail section of the necessary assemblage of elements for taking pictures with one fluorescent screen.

Figure 8 is a similar section with two fluorescent screens.

In looking at an opaque object against a white or luminous background, or with light thrown upon it from behind, so that the vision is confined to or concentrated upon outlines, the vision which can be obtained with one eye corresponds as to outline to the ordinary X-ray picture, except as the X-ray picture also contains indication of thickness or density as hereinafter referred to. That is, such a view is equivalent to a shadow cast by the object focused on the retina of the eye. But with two eyes viewing an object under such circumstances there is obtained the impression of relief because of the two slightly different shadows of which the two eyes respectively receive impressions; and two such shadow pictures may be taken in a stereoscopic camera and viewed through a stereoscope to produce the same appearance of relief which the natural vision with two eyes affords under these circumstances.

The same value of relief or perspective is obtained by the present invention in the case of an X-ray picture, but this additional value, that inasmuch as an X-ray picture gives account, not only of outline, but also to a valuable extent of thickness or density in the direction of the X-ray beam, two pictures taken with the direction of the beam changed by as much as the difference in the direction of vision of two eyes of an observer, will differ just as the vision of the two eyes would differ, if the body were transparent, so that varying thickness could be observed by the eye. And just as two eyes looking at a transparent object of varying thickness, will see that variation of thickness and translate the impression into the surface configuration which results from that varying thickness, so two X-ray pictures produced by the beam projected from two directions, differing as much as the direction of vision of the two eyes would differ when arranged so that two eyes see, each the picture corresponding to its own direction of vision and not the other picture, give the observer the impression, not only of outline relief, but also in a large measure of surface configuration due to varying thickness and density. That is, the observer is enabled to see the object as it would be seen by a normal vision if it were transparent; i. e., both in relief and with the front and back surfaces distinguishable in their configuration at varying distance apart at different areas.

These results are obtained by apparatus for producing and viewing X-ray pictures which will now be described by reference to the accompanying drawings.

In the drawings, A represents a portion of a limb of which an X-ray picture is to be taken, B being the bone therein, and C a foreign substance to be located by means of the picture. D is a plate having on the surface toward the limb to be pictured a sensitized film, $d$, adapted to receive an impression from the X-ray. E is a screen of aluminum which is substantially transparent to the X-ray. This screen has the surface which lies contiguous to the film grooved with a multiplicity of narrow, closely-spaced grooves which are filled with lead, lead being opaque to the X-rays, so that said surface consists of alternating lineal areas, $e^1$ and $e^2$, of aluminum and lead respectively; that is, alternating lines or lineal areas, transparent and opaque, respectively, to the X-ray. F and $F^1$ represent the foci or emanating points of the X-ray beams, or two positions of the target of an X-ray tube. These two positions are separated such a distance that the angle between the X-ray beams from them respectively at their incidence upon a given point of a surface of the film is substantially the angle between the two rays from that point to the two eyes of an observer at a normal viewing distance from the picture. H is a frame or holder called a cassette comprising the four sides, $H^1$, $H^1$, and $H^2$, $H^3$, and the aluminum screen plate, E, above described which constitutes a wall of the cassette, the four sides being permanently secured to that face of the plate, E, in which are the lead-filled grooves described, the securement of the side bars to said wall plate being such as to exclude the passage of light rays between the plate and the side bars. The side bars, $H^1$, $H^1$, are rabbeted at $h^1$ for engagement and guidance of the film or plate engaging slides, J, J, which are shown as integral with a bar, $J^1$, making a rigid frame sliding in said rabbets. The slide members, J, J, may have right-angled notches, $J^2$, $J^3$, to afford accurate engagement for film or plates of different dimensions, the ends of said slide members, J, J, making right angles with the side bars, $H^1$, affording accurate seating for the widest plate to be accommodated in the cassette. L is a rock shaft or cam rod journaled in the sides, $H^1$, $H^1$, of the cassette, and having toward their opposite ends flats, $L^1$, $L^1$, formed by cutting back the rock shaft or cam rod segmentally, thus making it afford cams for operating, as the shaft or rod is rocked, against the bar, $J^1$, which is provided with extending lugs, $j^1$, $j^1$, exposed to this cam action. The rock shaft L, has a lever arm, $L^2$, outside the side bars, $H^1$, for rocking it between limits which are fixed by check pins, $m$, $m$, the angular throw permitted being sufficient to carry the flats, $L^1$, $L^1$, from position abutting flat against the co-operating protrusions, $j^1$, of the bar, J, to a position entirely clearing said protrusions. The rocking of this cam rod or rock shaft serves to shift the film plate edgewise in direction crosswise of the lead lines of the screen, E, a distance substantially equal to the width of the lead lines thereof, which is substantially equal to the width of the intervening aluminum areas. At the opposite edge the plate is engaged by a second bar, $J^4$, also formed with end portions, J, having notches, $J^2$, $J^3$, in which the corners of the plate are held. A spring, N, secured to the side bar, $H^2$, and acting upon the bar, $J^4$, yieldingly resists the thrust of the film or plate toward said side bar, and follows it up when the cam rod or rock shaft, L, is rocked to bring its flats, $L^1$, into co-operation with the projections, $j^1$, of the bar, $J^1$. The side bars, $H^1$, $H^1$, are grooved at $h^3$, and the bars, $H^2$ and $H^3$, are rabbeted to afford a seat at $h^4$, in the plane of the lower edge of the grooves, $h^3$. C is a closure plate adapted to lodge on said rabbets, $h^4$, and engages the grooves, $H^3$, for enclosing the elements of the device already described and excluding the luminous rays which might otherwise pass around the edges and befog the film. Two thrust pins, R, R, are set through one of the side bars, $H^1$, from the outside into the groove, $h^3$, in that bar, and springs $R^1$, $R^1$, secured to the bar, press said thrust pins inward into the grooves. The cover plate is applied by lodging two opposite edges on the rabbets, $h^4$, and thrusting the intervening edge into the groove of one of the bars, $H^1$, against the thrust pins until the opposite edge of the cover plate clears the opposite edge of the other bar, $H^1$, so that the plate can be depressed at that edge to engage the groove $h^3$ in that bar into which it will be thrust by the reaction of the thrust pins in the opposite bar.

For making the stereoscopic X-ray picture, the cassette containing the plate or film with its sensitized side placed against the inner face, which is the lead-lined-side, of the screen, E, will be mounted with the outer surface of the aluminum bottom plate, E, against the surface of the limb of which the picture is to be made, at the opposite side thereof from the source of the X-ray beam; and an exposure is made with the beam emanating from the focus, F. Then, without moving the cassette from its position, the cam rod or rock shaft, L, is rocked to operate the cams and shift the film plate laterally,—that is, crosswise of the lead-lines and alternating aluminum lines of the screen, E; and thereupon a second picture is taken by means of an X-ray beam emanating from $F^1$. Each picture, it will be understood, consists of a series of narrow and narrowly separated parallel areas or strips, the strips which form one picture alternating on the film with those which form the other picture.

When this picture is viewed through a transparent screen, K, placed over the face of the picture,— i. e., at the film side of the plate,—with the light coming from behind the plate and with the surface of the screen, K, having the obscuration lines, k, at the side remote from the film, said screen may be adjusted laterally with respect to the lines until the obscuration lines are positioned with respect to the alternating strips constituting the two pictures formed upon the plate, so that one set of strips is hidden from one eye, at $I^1$, as indicated in Figure 2, and the other set of strips is hidden from the other eye at $I^2$; whereupon each eye will see a picture substantially as the object presented would be seen by that eye alone; and the two impressions thus made separately upon the two eyes will be translated as the impressions made upon the retinas of the two eyes would be translated if the observer were viewing the object directly; so that there will be the same effect or impression of relief or perspective as would be obtained in looking directly at the object.

It will be noticed that in order that the lead filling of the grooves in the plate, D, which form the lines on that plate opaque to the X-ray may not obstruct a greater width of one X-ray beam than of the other, by reason of the difference in direction from which the beams respectively are projected, it is important that the grooves be made V-shaped or narrowing in width back from the surface, so that the lead filler becomes laterally beveled or tapered in cross section as shown in the drawings.

It will also be observed that the width of the obscuration lines and alternating transparent lines of the viewing screen, K, should theoretically diminish gradually from the middle part of that screen outward; that is, when the screen is wider than the distance assumed as the distance between the two eyes of the observer. For the purpose of locating the two X-ray foci from which the two pictures are taken, an accurate stereoscopic effect as to so much of the picture as lies outside that width requires this progressive narrowing up of the lines, because the surface of the viewing screen having the obscuration lines is necessarily at a sufficient distance from the surface of the picture viewed to permit the rays of light to pass out from behind these obscuration lines to one eye or the other. This distance, which is the thickness of the glass screen itself, is almost negligible as to its effect in necessitating the graduation in width of said obscuration lines in the case of a picture only slightly wider than the distance between the eyes,—that is, say up to four or five inches in width; but for perfect stereoscopic effect over the entire area of the picture more than three inches in width, this feature should be taken into account, as described.

It is well understood that the action of the X-ray on the sensitized film is comparatively slow, and that a sensible length of exposure is necessary for producing any effective X-ray picture. It is also well understood that by the interposition of a fluorescent screen causing the production of luminous rays by the impact of the X-rays, a picture is produced upon the film primarily by the luminous rays and by employing a film highly sensitive to luminous rays, a picture primarily caused by the X-rays may be taken with an approximation to the speed with which an ordinary photographic negative may be produced.

Advantage may be taken of this well understood value of fluorescent screen by employing such screen in the apparatus described and for the purpose described, the sensitized film being interposed between such fluorescent screen and the lead-lined aluminum screen, as shown in Figure 7, in which the fluorescent screen is indicated at X.

For further improving the effect in respect to the speed at which the picture may be taken, a second fluorescent screen, Y, may be interposed at the opposite side of the film plate from the first screen, X, as shown in Figure 8. The impact of the X-ray passing through the film generates luminous rays upon the second fluorescent screen, Y, which are projected back in the direction of the inciting or generating X-ray, thereby making it act upon the film at the same point as the X-ray and intensifying the effect and correspondingly hastening the actinic action.

I claim:

1. The method of making a stereoscopic X-ray picture which consists in making successively two exposures of a suitably-sensitized film plate to the action of two X-ray beams projected through and past the object to be pictured from two foci situated at such distance apart as to make the angle between them at their incidence upon any given point of the film substantially the angle between rays emanating from that point to the eyes of an observer at a normal distance for viewing the picture, and interposing at the side of the film toward the X-ray beams a screen whose surface adjacent to the film has relatively fine lines alternatingly opaque and transparent to the X-ray beams, and shifting relatively to each other the screen and the film plate between the two exposures.

2. The method of making a stereoscopic X-ray picture as defined in claim 1 foregoing, in which the last mentioned step consists in shifting the film plate upon the screen plate between the two exposures.

3. The method of making a stereoscopic X-ray picture which consists in making successively two exposures of a suitably sensitized film plate to the action of two X-ray beams projected through the past the object to be pictured from two foci, situated at such distance apart as to make the angle between them at their incidence upon any given point of the film substantially the angle between rays emanating from that point to the eyes of an observer at a normal distance for viewing the picture, and interposing at the side of the film toward the X-ray beams, a screen whose surface toward the film has relatively fine lines, alternately opaque and transparent to the X-ray beam, interposing a fluorescent screen between said last mentioned screen and the film, and shifting relatively to each other the first mentioned screen and the film plate between the two exposures.

4. A screen for use in producing stereoscopic X-ray pictures consisting of a plate made of material opaque to ordinary light rays and penetrable by X-rays, such plate having on one surface alternating parallel grooves and spaces, the grooves being tapered in cross-section, narrowing in width toward the opposite surface of the plate, and being filled with a substance opaque to the X-ray.

5. A screen for use in producing stereoscopic X-ray pictures consisting of an aluminum plate having in one surface parallel grooves alternating with smooth areas, the grooves being filled with lead evenly to the plane of the surface of the plate, the grooves being narrowing in cross-section from the surface of the plate inward.

6. An apparatus for taking stereoscopic X-ray pictures which comprises a cassette having a wall plate of aluminum provided on its inner surface with parallel lead-filled grooves, sub-dividing that surface into alternating lines or narrow areas, respectively transparent and opaque to the X-ray and thereby constituting a screen for the X-ray beam; means for holding the sensitized plate snugly against said inner surface of the aluminum screen, and means for shifting the sensitized plate transversely of the lines on the aluminum screen.

7. In the construction defined in claim 6 foregoing, the means for holding the sensitized plate against the screen plate, consisting of a closure plate and a spring interposed between said closure plate and the film plate for pressing the latter toward the screen plate, two opposite side bars of the cassette having inwardly-facing grooves adapted to receive two opposite edges of the closure plate, and the other two opposite sides having rabbets forming shoulders in the plane of the inner side of said grooves, whereby the cover plate engaged at two opposite edges in said grooves may be lodged at the other two opposite edges on said shoulder, and spring means in the bottom of one of the grooves for thrusting the opposite edge of the closure plate into the groove of the opposite side of the cassette.

8. In the construction defined in claim 6 foregoing, the means for shifting the film plate comprising a spring at one side of the cassette against which one edge of the film plate lodges, a frame at the opposite end of the cassette mounted for sliding in the other two sides of the cassette, adapted for engaging and thrusting against the edge of the film plate, and a cam rod mounted for rocking in the cassette side bars having cam elements engaging said sliding device for thrusting it toward the film plate to thrust the latter against the spring at its opposite side, and means for rocking said cam rod on the outside of the cassette.

In testimony whereof, I have hereunto set my hand at Chicago, Illinois, this 26th day of May, 1919.

Dr. LOUIS W. PEASE.